United States Patent
Mori et al.

(10) Patent No.: US 7,776,181 B2
(45) Date of Patent: Aug. 17, 2010

(54) RETENTION IMPROVING COMPOSITION

(75) Inventors: Yoshio Mori, Nagoya (JP); Koichi Adachi, Nagoya (JP); Ken Takeda, Takaoka (JP); Tetsuya Tsuzuki, Sakaide (JP)

(73) Assignee: Toagosei Co., Ltd., Tokyo (JP)

( * ) Notice: Subject to any disclaimer, the term of this patent is extended or adjusted under 35 U.S.C. 154(b) by 264 days.

(21) Appl. No.: 11/794,336

(22) PCT Filed: Dec. 28, 2005

(86) PCT No.: PCT/JP2005/024023
§ 371 (c)(1),
(2), (4) Date: Jun. 28, 2007

(87) PCT Pub. No.: WO2006/070853
PCT Pub. Date: Jul. 6, 2006

(65) Prior Publication Data
US 2008/0004405 A1    Jan. 3, 2008

(30) Foreign Application Priority Data
Dec. 28, 2004  (JP) ............................. 2004-381092
Dec. 28, 2004  (JP) ............................. 2004-381099

(51) Int. Cl.
D21H 11/00  (2006.01)
D21H 13/00  (2006.01)
D21H 15/00  (2006.01)
C08L 33/02  (2006.01)
C08L 33/06  (2006.01)

(52) U.S. Cl. .............. 162/168.3; 162/168.1; 162/168.2; 162/168.7; 162/164.1; 525/221; 525/227; 525/230

(58) Field of Classification Search ................. 525/221, 525/218, 227, 230; 162/168.2, 168.3, 168.1, 162/168.7, 164.1
See application file for complete search history.

(56) References Cited

U.S. PATENT DOCUMENTS

| | | | | |
|---|---|---|---|---|
| 5,132,284 A | * | 7/1992 | Tsai | 507/110 |
| 5,178,730 A | * | 1/1993 | Bixler et al. | 162/168.3 |
| 5,571,380 A | * | 11/1996 | Fallon | 162/168.2 |
| 5,736,008 A | * | 4/1998 | Barrows et al. | 162/102 |
| 6,103,064 A | | 8/2000 | Asplund et al. | |
| 2003/0188738 A1 | * | 10/2003 | Laleg | 127/32 |
| 2005/0230319 A1 | * | 10/2005 | Mori et al. | 210/732 |
| 2007/0138105 A1 | * | 6/2007 | Takeda et al. | 210/702 |

FOREIGN PATENT DOCUMENTS

| | | | |
|---|---|---|---|
| EP | 339372 | * | 11/1989 |
| EP | 877120 | * | 11/1998 |
| FR | 2761366 | * | 10/1998 |
| JP | 03213597 | * | 9/1991 |
| JP | 04-281095 A | | 10/1992 |
| JP | 11-081187 A | | 3/1999 |
| JP | 11081187 A | | 3/1999 |
| JP | 2945761 B2 | | 6/1999 |
| JP | 2002177709 | * | 6/2002 |
| JP | 2003-175302 A | | 6/2003 |
| JP | 2003175302 | * | 6/2003 |
| JP | 2003-193395 A | | 7/2003 |
| JP | 2003193395 | * | 7/2003 |
| JP | 2004-209413 A | | 7/2004 |
| JP | 2004-210986 A | | 7/2004 |
| JP | 2004210986 A | | 7/2004 |
| JP | 2004-225208 A | | 8/2004 |

OTHER PUBLICATIONS

Notification of the First Office Action from the Patent Office of the People's Republic of China; translation of the text portion of the Notification of the First Office Action.
Extended European Search Report issued on Mar. 5, 2010 in European Application No. 05844841.6.

* cited by examiner

Primary Examiner—Vasu Jagannathan
Assistant Examiner—Irina Krylova
(74) Attorney, Agent, or Firm—Fitch Even Tabin & Flannery; Kendrew H. Colton

(57) ABSTRACT

A novel retention aid is provided, which can realizes not only high retention but also excellent paper formation and is easy to use, in various papermaking processes. A composition for improving retention is provided, which comprises (A) a cationic water-soluble polymer and (B) an amphoteric water-soluble polymer. The component (A) preferably is a copolymer having a cation equivalent of 0.05 to 4.00 meq/g or one having a 0.5% salted viscosity of 30 to 200 mPa·s. The component (B) preferably is either a copolymer comprising a cationic radical-polymerizable monomer unit, an anionic radical-polymerizable monomer unit, and a nonionic radical-polymerizable monomer unit, or an amphoteric water-soluble polymer obtained by polymerizing a cationic radical-polymerizable monomer with an anionic radical-polymerizable monomer in the presence of a polysaccharide. From the standpoint of attaining excellent formation, the component (B) preferably has a molar proportion of the cationic radical-polymerizable monomer unit to the anionic radical-polymerizable monomer unit (hereinafter referred to as Ca/An) satisfying Ca/An<1.2.

14 Claims, No Drawings

RETENTION IMPROVING COMPOSITION

This Application is the U.S. National Stage Application under 35 U.S.C. 371 of International Application PCT/JP/2005/024023 filed Dec. 28, 2005 which claims benefit from Japanese patent application number 2004-381092 filed Dec. 28, 2004 and Japanese patent application number 2004-381099 filed Dec. 28, 2004, the complete disclosures of which are incorporated herein by reference.

TECHNICAL FIELD

The present invention relates to a composition for improving retention, which comprises a cationic water-soluble polymer and an amphoteric water-soluble polymer. The composition according to the present invention is particularly useful as retention aids and in the technical field of the papermaking industry.

BACKGROUND ART

Conventionally, in papermaking processes, when or after a filler-containing stuff is diluted to a final concentration for feeding into a papermaking machine, a retention aid is added thereto so that the pulp and filler are prevented from flowing from the papermaking machine to white water, thereby improving retention.

As the retention aid, water-soluble polymers such as water-soluble high-molecular-weight polyethyleneoxide and cationic polyacrylamide are usually used.

However, the retention aids containing these water soluble polymers must be used in a relatively large amount in order to improve the retention. As a result, they are problematic in that huge flocs are produced, thereby considerably deteriorating paper formation.

In order to solve this problem, a so-called dual system in which a cationic polymer is used in combination with an anionic compound or polymer is recently noticed. Typical examples thereof include a method in which an anionic inorganic compound such as bentonite is added after addition of a cationic polymer (Patent Document 1), and a method in which an anionic colloidal silica is added after addition of a cationic polymer (Patent Document 2).

Patent Document 1: Japanese Patent Laid-Open (Kokai) No. 04-281095 (claims).

Patent Document 2: Japanese Patent No. 2945761 (claims).

DISCLOSURE OF INVENTION

Problems to be Solved by the Invention

Although the retention aids described in the Patent Documents 1 and 2 are relatively good in balance between the retention and the paper formation, the level of improvement is still not sufficient. Moreover, these retention aids comprise two liquids that must be used in combination, and thus they are disadvantageous in that they must be used in the papermaking process in a complicated manner, for example, taking into account where and when each liquid is added, and how much each liquid is combined together.

In order to solve the above problems, the present inventors have suggested a retention aid which comprises a composition containing two amphoteric polymers which are different in ionic equivalent with each other (Patent Document 3).

This retention aid exhibits an excellent performance to solve the above mentioned problems, but is sometimes insufficient in use for applications that require more excellent retention. Particularly it is sometimes insufficient in retention and paper formation depending upon types of stuff to be used.

The present inventors have made intensive researches for finding out a novel retention aid which can achieve a high retention, can ensure an excellent paper formation, and is easy to use in various papermaking systems.

Patent Document 3: Japanese Patent Laid-Open (Kokai) No. 2003-175302 (claims).

Means for Solving the Problems

The present inventors have made various studies, and as a result have found out that a composition comprising a cationic water-soluble polymer and an amphoteric water-soluble polymer is effective. Thus, the present invention has been completed.

The present invention is described below in detail.

In this specification, acrylate or methacrylate is designated as (meth)acrylate; acrylic acid or methacrylic acid as (meth)acrylic acid; and acrylamide or methacrylamide as (meth)acrylamide.

1. Composition for Improving Retention

The present invention relates to a composition for improving retention, which comprises (A) a cationic water-soluble polymer (hereinafter referred to as component (A)) and (B) an amphoteric water-soluble polymer (hereinafter referred to as component (B)). Hereinafter, each component will be described.

1-1. Component (A)

As the cationic water-soluble polymer of the component (A) used in the present invention, various polymers may be used in so far as they are cationic.

Preferably, the component (A) is a copolymer comprising a cationic radical-polymerizable monomer (hereinafter simply referred to as cationic monomer) unit and a nonionic radical-polymerizable monomer (hereinafter referred to as nonionic monomer) unit.

1-1-1. Cationic Monomers

As the cationic monomer, various compounds may be used in so far as they have radical polymerizability. Examples of the cationic monomer include tertiary salts exemplified by hydrochlorides and sulfates of dialkylaminoalkyl(meth)acrylates such as dimethylaminoethyl(meth)acrylate, diethylaminoethyl (meth)acrylate, dimethylaminoethyl(meth)acrylate, diethylamino-2-hydroxypropyl(meth)acrylate, and dimethylaminopropyl(meth)acrylate; tertiary salts exemplified by hydrochlorides and sulfates of dialkylaminoalkyl(meth)acrylamides such as dimethylaminoethyl(meth)acrylamide; quaternary salts exemplified by alkyl halide adducts such as methyl chloride adducts and aryl halide adducts such as benzyl chloride adducts of dialkylaminoalkyl(meth)acrylates; and quaternary salts exemplified by alkyl halide adducts such as methyl chloride adducts and aryl halide adducts such as benzyl chloride adducts of dialkylaminoalkyl (meth)acrylamides.

Among these compounds, quaternary salts of dialkylaminoalkyl(meth)acrylates are preferable; alkyl halide adducts of dialkylaminoalkyl(meth)acrylates are more preferable.

1-1-2. Nonionic Monomers and Other Monomers

The nonionic monomer includes (meth)acrylamide, dimethyl(meth)acrylamide, diethyl(meth)acrylamide, hydroxylethyl(meth)acrylate, ethylene oxide added methoxy(meth)acrylate, and ethylene oxide added (meth)allyl ether.

Among these, (meth)acrylamide is preferable.

Monomers other than the above described monomers may be used in combination as required. Other monomers include, for example, methoxyethyl(meth)acrylate, butoxyethyl (meth)acrylate, ethylcarbitol (meth)acrylate, methyl(meth) acrylate, ethyl(meth)acrylate, and vinyl acetate.

1-1-3. Production Method

A method for producing the component (A) is not particularly restricted, and general polymerization methods may be adopted. For example, as for aqueous polymerization, a method can be adopted in which thermal radical polymerization is effected using potassium persulfate, ammonium persulfate, 2,2'-azobis(2-amidinopropane) dihydrochloride, a redox polymerization initiator or the like as a polymerization initiator, or photoradical polymerization based on UV irradiation is effected using a benzoin or acetophenone based photopolymerization initiator. Further, as for reversed phase emulsion polymerization, polymerization may be effected using water insoluble initiators such as azobisisobutyronitrile and benzoyl peroxide in addition to the above-mentioned polymerization initiator.

The obtained polymer in a form of gel is then cut or chopped by a method known in the art. The chopped polymer is dried at a temperature of about 60 to 150° C. by means of a dryer such as a band dryer, a rotary dryer, a far-infrared dryer and a vibrating fluid bed dryer, ground into powdered polymer by means of a roll type grinder or the like, and subjected to size control.

When a component (A) obtained by water-in-oil (inverse phase) emulsion polymerization is actually used, it is phase-inverted to an oil-in-water emulsion by adding a hydrophilic surfactant with a relatively high HLB and diluting with water.

As the component (A), one which is in a form of powder is preferably used.

The component (A) according to the present invention preferably has a cation equivalent of 0.05 to 4.00 meq/g. When the cation equivalent is less than 0.05 meq/g, paper formation is often impaired. When the cation equivalent is greater than 4.00 meq/g, retention is often lowered.

The cation equivalent in the present invention means a value measured by the colloidal titration method.

The component (A) according to the present invention may contain the cationic monomer in an amount sufficient to meet the above preferred cation equivalent, and preferably contains 0.5 to 55.0 mole percent of the cationic monomer.

The component (A) preferably has a 0.5% salted viscosity as an indicator of molecular weight of 30 to 200 mPa·s, more preferably 30 to 120 mPa·s, and particularly preferably 30 to 90 mPa·s. When the salted viscosity is less than 30 mPa·s, retention is often lowered. When the salted viscosity is greater than 200 mPa·s, formation is often impaired.

Meanwhile, the "0.5% salted viscosity" in the present invention means a value obtained by dissolving a polymer in a 4% sodium chloride aqueous solution to obtain a 0.5 wt % sample solution of the polymer, and subjecting it to measurement at 25° C. by use of a B type viscometer with a rotor No. 1 or 2 at 60 rpm.

1-2. Component (B)

As the amphoteric water-soluble polymer of the component (B) used in the present invention, various kinds of polymers may be used. Preferably, the component (B) is a copolymer comprising a cationic monomer unit and an anionic radical-polymerizable monomer (hereinafter simply referred to as anionic monomer) unit.

1-2-1. Cationic Monomer

As the cationic monomer, the monomers as mentioned above can be used.

Among those monomers, quaternary salts of dialkylaminoalkyl(meth)acrylates are preferable, and alkyl halide adducts of dialkylaminoalkyl(meth)acrylates are more preferable.

1-2-2. Anionic Monomer

As the anionic monomer, various compounds may be used in so far as they have radical polymerizability. Examples of the anionic monomer include unsaturated carboxylic acids such as (meth)acrylic acid, crotonic acid, itaconic acid, and maleic acid, and salts thereof. Examples of the salts include ammonium salts and salts of alkali metals such as sodium and potassium.

Among these, (meth)acrylic acid is preferable.

1-2-3. Other Monomers

In the present invention, the component (B) comprises the cationic monomer and the anionic monomer as indispensable components, and may further comprise a nonionic monomer as required.

As the nonionic monomer, the monomers mentioned above may be used.

Among those monomers, (meth) acrylamide is preferable.

Monomers other than the above described monomers may be used in combination as required. Examples of such monomers include what are described above.

As the preferred combination of monomers in the present invention, mention may be made of (1) a copolymer comprising a tertiary salt or quaternary salt of a dialkylaminoalkyl acrylate as a cationic monomer, an acrylic acid salt as an anionic monomer, and an acrylamide as a nonionic monomer, (2) a copolymer comprising a tertiary salt or quaternary salt of a dialkylaminoalkyl methacrylate as a cationic monomer, an acrylic acid salt as an anionic monomer, and an acrylamide as a nonionic monomer, and (3) a copolymer comprising a tertiary salt or quaternary salt of a dialkylaminoalkyl methacrylate and a tertiary salt or quaternary salt of a dialkylaminoalkyl acrylate as cationic monomers, an acrylic acid salt as an anionic monomer, and an acrylamide as a nonionic monomer.

The component (B) herein can be produced according to the production method as described above.

The amphoteric water-soluble polymer of the component (B) is preferably a polymer (hereinafter referred to as a polysaccharide-modified amphoteric polymer) obtained by polymerizing the cationic monomer with the anionic monomer in a presence of a polysaccharide, because such a polymer realizes both high retention and high formation.

Hereinafter, respective components and production methods of the polysaccharide-modified amphoteric polymer will be described.

1-2-4. Polysaccharide-Modified Amphoteric Polymer

1) Polysaccharide

In the present invention, various polysaccharides may be used.

By way of example, polysaccharides from natural sources include starches. Specific examples of starches include potato starch, waxy potato starch, sweet potato starch, sugarcorn starch, high-amylose corn starch, wheat starch, rice starch, tapioca starch, sago starch, glumannan, and galactan; and starch raw materials such as wheat flour, corn flour, cut and dried sweet potato, and cut and dried tapioca.

Examples of polysaccharides other than starches include celluloses such as methyl cellulose, ethyl cellulose, hydroxyethyl cellulose and carboxymethyl cellulose, sodium alginate, gum arabic, dextran, gelatin, casein, collagen, chitin, and chitosan.

Preferred polysaccharides are starches, specifically including the above-described starches such as potato starch, waxy potato starch, sweet potato starch, sugarcorn starch, high-amylose corn starch, wheat starch, rice starch, tapioca starch, sago starch, glumannan, and galactan.

The starch may be a processed starch obtained by chemical or enzymatic modification. Processing methods include, for example, oxidation, esterification, etherification, and acid treatment.

Polysaccharides used in the present invention are preferably the above-described polysaccharides which have been made cationic or amphoteric by an ordinary method because they have excellent copolymerizability with the later-described monomers and have excellent flocculating performances.

Polysaccharides may be cationized by an ordinary method.

Cationizing methods include treatment of a starch raw material with a cationizing agent. Specific examples of the cationizing agent include tertiary amines such as diethylaminoethyl chloride and quaternary ammonium salts such as 3-chloro-2-hydroxypropyltrimethylammonium chloride and glycidyltrimethylammonium chloride.

The cationized polysaccharide preferably has a degree of cation substitution of 0.01 to 0.06 weight/weight %, more preferably 0.02 to 0.06 weight/weight % in terms of nitrogen atom.

Polysaccharides may be, for example, those which have been subjected to a known reaction after the cationization. By way of example, they may be amphoteric polysaccharides which have been subjected to an anionization reaction. Specific examples of the anionization reaction include phosphorylation using an inorganic phosphate or the like; urea phosphorylation and oxidation using a hypohalite or the like; carboxymethylation using monochloroacetic acid; and sulfation.

Polysaccharides are preferably employed in a form of a glue solution, and thus are preferably those subjected to cooking treatment. Herein, "cooking" refers to treatment of heating polysaccharides to their gelatinization temperature or higher. Here, the heating temperature may be set as appropriate, depending on the type of the starch to be used, but is preferably 70° C. or higher. The cooking of starches may be conducted in a batch or continuous process.

The cooking may be carried out after, or simultaneously with, the above-described cationization.

Preferably, the viscosity of the starch glue solution to be used is 100 to 10,000 mPa·s as determined at 25° C. and at a solid content of 10 to 40 weight % using a type B viscometer.

The polysaccharide glue solution used in the invention is preferably diluted with water and made into a 3 to 10 weight % slurry.

When the polysaccharide glue solution has aged or solidified or has become poor in dispersability in water, it is preferably subjected to cooking treatment prior to use. In this case, the cooking method may be the same as that described above.

2) Monomers

As the cationic monomer, the anionic monomer, and other monomers, those mentioned above may be used. As preferred monomers, those mentioned above may also be used.

3) Production Method

The polysaccharide-modified amphoteric polymer is one which is obtained by polymerizing a cationic monomer and an anionic monomer in a presence of a polysaccharide.

This kind of production method includes, for example, a method in which a cationic monomer and an anionic monomer are polymerized in the presence of a polymerization initiator and a polysaccharide in accordance with an ordinary method.

Hereinafter, the respective components to be used, method of polymerization, and the like will be explained.

(1) Proportion and Combination of Polysaccharide and monomer

Referring to the proportion of polysaccharide and monomer of the polysaccharide-modified amphoteric polymer of the present invention, the proportion of the monomer is preferably 50 weight % or more, more preferably 50 to 99 weight % based on the total amount of the polysaccharide and all the monomers.

When the proportion of the monomer is less than 50 weight %, the resultant polymer sometimes becomes insoluble in water, or does not provide a high molecular weight polymer for use as a flocculant.

As the preferred combination of monomers in the present invention, mention may be made of (1) a copolymer comprising a tertiary salt or quaternary salt of a dialkylaminoalkyl acrylate as a cationic monomer, an acrylic acid salt as an anionic monomer, and an acrylamide as a nonionic monomer, (2) a copolymer comprising a tertiary salt or quaternary salt of a dialkylaminoalkyl methacrylate as a cationic monomer, an acrylic acid salt as an anionic monomer, and an acrylamide as a nonionic monomer, and (3) a copolymer comprising a tertiary salt or quaternary salt of a dialkylaminoalkyl methacrylate and a tertiary salt or quaternary salt of a dialkylaminoalkyl acrylate as cationic monomers, an acrylic acid salt as an anionic monomer, and an acrylamide as a nonionic monomer.

(2) Polymerization Initiator

The polymerization initiator includes azo polymerization initiators, redox polymerization initiators, photopolymerization initiators, and the like.

Hereinafter, each polymerization initiator will be described.

Azo Polymerization Initiator

Employed as azo polymerization initiators may be various compounds, and specific examples thereof include 4,4'-azobis(4-cyanovaleric acid) (10-hour half life temperature: 69° C.; the below-described temperatures inside the parentheses show the same meaning); 2,2'-azobisisobutyronitrile (65° C.); 2,2'-azobis(2-methylbutyronitrile) (67° C.); 2,2'-azobis[2-methyl-N-(2-hydroxyethyl)propionamide] (86° C.); 2,2'-azobis(2-amidinopropane) hydrochloride (56° C.); and 2,2'-azobis[2-(2-imidazolin-2-yl)propane]hydrochloride (44° C.).

Azo polymerization initiators may be used alone or in a combination of two or more.

Among the above-described azo polymerization initiators, preferable compounds are azo polymerization initiators which have a 10-hour half life temperature of 50° C. or more, more preferably 50 to 90° C., even more preferably 50 to 70° C. since they have a high solubility in water, generate a polysaccharide-modified amphoteric polymer containing no or little insoluble matter, produce a polysaccharide-modified amphoteric polymer with a high molecular weight, and provide a polysaccharide-modified amphoteric polymer containing a reduced amount of unreacted monomers.

Proportion of the azo polymerization initiator to be used is preferably 50 to 5,000 ppm, more preferably 100 to 3,000 ppm, even more preferably 300 to 1,000 ppm, based on the total amount of the polysaccharide and the monomer. An azo polymerization initiator proportion of less than 50 ppm results in incomplete polymerization with an increased amount of residual monomers; more than 5,000 ppm provides a water-soluble polymer with lower molecular weight.

Redox Polymerization Initiator

The redox polymerization initiator is a combination of an oxidizing agent and a reducing agent.

The oxidizing agent is preferably a peroxide because it has a hydrogen-abstracting effect on polysaccharides and grafts monomers onto polysaccharides favorably. Examples of the peroxide include persulfates such as sodium persulfate, potassium persulfate, and ammonium persulfate, organic peroxides such as benzoyl peroxide, t-butyl hydroperoxide, and succinic acid peroxide, hydrogen peroxide, and sodium bromate. Among these peroxides, persulfates are preferred in that they are excellent in hydrogen-abstracting effect even at low temperature at the beginning of polymerization.

Examples of the reducing agent include sulfites such as sodium sulfite, bisulfites such as sodium bisulfite, ascorbic acid or its salts, rongalite, dithionous acid or its salts, triethanolamine, and cuprous sulfate.

Examples of a preferred combination of the peroxide and the reducing agent include a persulfate and a sulfite, and a persulfate and a bisulfite.

Proportion of the oxidizing agent is preferably 10 to 1,000 ppm, more preferably 20 to 500 ppm, particularly preferably 40 to 200 ppm, based on the total amount of the polysaccharide and the monomer. A proportion of less than 10 ppm may result in insufficient hydrogen-abstracting; more than 1,000 ppm may allow the polysaccharide-modified amphoteric polymer to become too low in molecular weight to exhibit sufficient performance.

Proportion of the reducing agent is preferably 10 to 1,000 ppm, more preferably 20 to 500 ppm, based on the total amount of the polysaccharide and the monomer.

When the redox polymerization initiator is used, it is preferably supplemented with a polymerization promoter, for example, one based on an inorganic metal such as cupric chloride and ferrous chloride.

Photopolymerization Initiator

Preferred photopolymerization initiators include ketal type photopolymerization initiators and acetophenone type photopolymerization initiators because they have a hydrogen-abstracting effect on polysaccharides and graft monomers onto polysaccharides favorably. In this instance, optical cleavage occurs to generate a benzoyl radical which functions as a hydrogen-abstracting agent.

Examples of the ketal type photopolymerization initiator include 2,2-dimethoxy-1,2-diphenylethan-1-one and benzyldimethylketal.

Examples of the acetophenone type photopolymerization initiator include diethoxyacetophenone, 4-(2-hydroxyethoxy)phenyl-(2-hydroxy-2-propyl)ketone, 1-hydroxycyclohexyl-phenylketone, 2-methyl-2morpholino(4-thiomethylphenyl)propan-1-one, 2-benzyl-2-dimethylamino-1-(4-morpholinophenyl)-butane, 2-hydroxy-2-methyl-1-phenylpropan-1-one, and 2-hydroxy-2methyl-1-[4-(1-methylvinyl)phenyl], and these oligomers.

In addition to the above compounds, the photopolymerization initiator may be a benzoin type photopolymerization initiator, a thioxanthone type photopolymerization initiator, or a photopolymerization initiator having a polyalkyleneoxide group as described in Japanese Patent Laid-Open (Kokai) No. 2002-097236.

Proportion of the photopolymerization initiator is preferably 10 to 1,000 ppm, more preferably 20 to 500 ppm, even more preferably 40 to 200 ppm, based on the total amount of the polysaccharide and the monomer. A proportion of less than 10 ppm may result in insufficient hydrogen-abstracting or an increase in the amount of residual monomers; more than 1,000 ppm may allow the polysaccharide-modified amphoteric polymer to become too low in molecular weight to exhibit sufficient performance.

When the photopolymerization initiator is used, a photosensitizer exemplified by an amine-based photosensitizer including triethanolamine and methyldiethanolamine may be also combined.

(3) Manner of Polymerization

Manner of polymerization includes aqueous polymerization, inverse phase suspension polymerization, and inverse phase emulsion polymerization; the aqueous polymerization and inverse phase emulsion polymerization are preferable in that they are easy to operate.

When the aqueous polymerization is adopted, the polysaccharide and the monomer are dissolved or dispersed in an aqueous medium to polymerize at 10 to 100° C. in the presence of the polymerization initiator, for example. The polysaccharide and the monomer as raw materials are dissolved or dispersed in water, and then added to an aqueous medium when they are used.

When the inverse phase emulsion polymerization is adopted, a method is employed, for example, in which an aqueous solution containing the polysaccharide and the monomer is stirred and mixed with an organic dispersion medium containing a hydrophobic surfactant with an HLB of 3 to 6 to perform emulsification, followed by polymerization at 10 to 100° C. in the presence of the polymerization initiator to yield a water-in-oil type (inverse phase) polymer emulsion. Examples of the organic dispersion medium include high boiling point hydrocarbon solvents such as mineral spirit.

Proportion of the polysaccharide and the monomer in the aqueous medium or organic dispersion medium may be set as appropriate according to purposes, and is preferably 20 to 70 weight %.

Polymerization method may be photopolymerization, redox polymerization, or the like according to types of the polymerization initiator to be used.

Concretely, the polymerization method may be carried out by adding the polymerization initiator to the aqueous solution or inverse phase emulsion containing the polysaccharide and the monomer.

The polymerization method can also be a combination of the photopolymerization and the redox polymerization.

When molecular weight is controlled, a chain transfer agent may be used. Examples of the chain transfer agent include thiol compounds such as mercaptoethanol and mercaptopropionic acid, and reducing inorganic salts such as sodium sulfite, sodium bisulfite, and sodium hypophosphite.

In the present invention, aqueous polymerization is preferable. In this instance, polymerization is preferably carried out under light irradiation because of short polymerization time and excellent productivity.

When the polymerization under light irradiation is carried out, ultraviolet light and/or visible light can be used as an irradiation light; the ultraviolet light is preferable.

Intensity of light irradiation is determined in consideration of types of the monomer, types or concentration of the photopolymerization initiator and/or photosensitizer, the molecular weight of the polysaccharide-modified amphoteric polymer of interest, polymerization time, and the like, and is, in general, preferably 0.5 to 1,000 W/m$^2$, more preferably 5 to 400 W/m$^2$.

Source of light may be, for example, a fluorescent chemical lamp, a fluorescent blue lamp, a metal halide lamp, or a high pressure mercury lamp.

In polymerization reaction under light irradiation, temperature of an aqueous solution of the monomer is not particularly restricted, but typically is preferably 5 to 100° C., more preferably 10 to 95° C. in order to allow the photopolymerization reaction to smoothly proceed under mild conditions. The temperature at the beginning of polymerization is preferably 5 to 15° C. since polysaccharide-modified amphoteric polymers high in molecular weight are obtained, and heat is easily removed.

The polymerization reaction under light irradiation of an aqueous solution of the monomer may be conducted in a batch process or a continuous process.

(4) Preferable Polymerization Method

The production method for the polysaccharide-modified amphoteric polymer is preferably a method in which a cationic monomer and a anionic monomer are polymerized in the presence of a polysaccharide, an azo polymerization initiator and a hydrogen-abstracting agent, because this allows polymers of high molecular weight to be grafted onto the polysaccharide, reduces the amount of residual monomers, and provides a polysaccharide-modified amphoteric polymer which exhibits various excellent flocculation performance when used as a flocculant.

The azo polymerization initiator includes those as mentioned above.

Examples of the hydrogen-abstracting agent include a redox hydrogen-abstracting agent (hereinafter referred to as an RD abstracting agent) and a photopolymerization initiator type hydrogen-abstracting agent (hereinafter referred to as a PT abstracting agent). The RD abstracting agent and PT abstracting agent not only abstract hydrogen from a polysaccharide, but also function as a polymerization initiator for the monomer.

The RD abstracting agent is preferably an oxidizing agent and the like, and examples of the oxidizing agent include those as mentioned above. In this case, it is preferably used in combination with a reducing agent.

The PT abstracting agent is preferably a ketal type photopolymerization initiator or an acetophenone type photopolymerization initiator, and examples thereof include those as mentioned above.

The polysaccharide-modified amphoteric polymer should contain, as a major ingredient, graft copolymers in which monomers are graft-polymerized onto a polysaccharide, but may contain polymers which result from the monomers but are not grafted onto the polysaccharide.

1-2-5. Treatment of the Obtained Component (B)

The component (B) obtained by aqueous solution polymerization, which is usually in a form of gel, is cut or chopped, dried and ground into powdered polymer in the manners as described above, and subjected to size control, and optionally supplemented with an additive or the like before it is used.

When the component (B) obtained by water-in-oil (inverse phase) emulsion polymerization is actually used, it is phase-inverted to an oil-in-water emulsion in accordance with the above-described method followed by dilution with water.

As the component (B), one which is in a form of powder is preferably used.

The component (B) preferably has a 0.5% salted viscosity of 10 to 100 Pa·s. The viscosity is more preferably 10 to 80 mPa·s, and particularly preferably 10 to 50 mPa·s for the purpose of achieving high retention and high formation. The component (B) having a viscosity outside the range of 10 to 100 mPa·s often impairs formation of papers.

In the component (B), a molar ratio Ca/An of the cationic monomer to the anionic monomer may be properly determined depending upon purposes.

When paper excellent in formation is required, the component (B) preferably satisfies Ca/An<1.2, and more preferably has a Ca/An of 0.5 to 0.9.

On the other hand, when paper excellent in retention is required, the component (B) preferably satisfies Ca/An>5, and more preferably has a Ca/An of 5 to 15.

Such a component (B) is obtained by copolymerizing the cationic monomer and the anionic monomer so as to satisfy the monomer ratio.

1-3. Method for Preparing Composition

The composition according to the present invention comprises the component (A) and the component (B) in combination.

The composition according to the present invention can be produced by mixing the component (A) and the component (B). Alternatively, each component may be added separately in the papermaking process which will be described later.

The component (A) and the component (B) may each comprise one kind of component, or two or more kinds of component. However, a combination of one kind of the component (A) and one kind of the component (B) is preferably used because of convenience.

Proportions of the component (A) and the component (B) in the composition may be properly determined depending on purposes. However, the composition is preferably constituted by 40 to 90 weight % of the component (A) and 10 to 60 weight % of the component (B).

The polymers of the composition of the present invention are preferably in a form of powder or inverse phase emulsion, more preferably in a form of powder.

In actual use, when the polymer is powder, the powder is dissolved in water, and used as an aqueous solution, or when the polymer is an inverse phase emulsion, it is diluted with water so as to be phase-inverted, and used in the form of an oil-in-water emulsion. In both cases, solid content is preferably 0.01 to 0.5 weight %, more preferably 0.01 to 0.1 weight %.

When the powder is dissolved in water and used as an aqueous solution, the aqueous solution preferably has a pH of 4 to 6.

2. Papermaking Process

The papermaking process using the present composition may be in accordance with a conventional method, and can be carried out by adding the present composition to stuff, and then performing papermaking.

The method for adding the retention aid can be in accordance with a conventional method in such a way that, for example, the aid is added when the stuff is diluted to the final concentration for feeding into the papermaking machine or added after the dilution.

Stuffs to which the retention aid is applied include those that have been used in the usual papermaking process, and usually contain at least pulp and filler, and optionally additives other than filler, specifically including sizing agents, fixers, paper strength agents, colorants and the like.

The retention aid of the present invention is preferably applied to pulp which is constituted by waste paper such as deinked waste paper in a relatively high proportion to the whole pulp. Also, the retention aid of the present invention can be preferably applied to the papermaking system high in filler content, the neutral papermaking system, and the high-speed papermaking system.

Examples of the fillers include clay, kaoline, agalite, talc, calcium carbonate, magnesium carbonate, sulfate of lime, barium sulfate, zinc oxide, titanium oxide and the like. Examples of the sizing agents include acrylic acid-styrene copolymers and the like; examples of the fixers include aluminum sulfate, cationic starch, alkylketene dimer and the like; and examples of the paper strength agents include starch, cationic or amphoteric polyacrylamide and the like.

Proportion of the retention aid to be added is preferably 50 to 500 ppm, more preferably 100 to 500 ppm in relation to the dry pulp weight in the stuff.

The pH value of the stuff after adding the retention aid is maintained to be preferably 5 to 10, more preferably 5 to 8. Immediately after the addition of the retention aid, the stuff is fed into the papermaking machine.

Effects of Invention

The composition of the present invention can be used as a retention aid of one-pack type that is not liable to where and when it is added during the papermaking process, and makes paper formation and retention of the papermaking process well-balanced.

BEST MODE FOR CARRYING OUT THE INVENTION

The present invention provides a retention improving composition comprising the component (A) and the component (B).

The component (A) is preferably a copolymer comprising a cationic monomer unit and a nonionic monomer unit, and preferably has a cation equivalent of 0.05 to 4.00 meq/g, and also preferably has a 0.5% salted viscosity of 30 to 200 mPa·s.

The component (B) is preferably a copolymer comprising a cationic radical-polymerizable monomer unit, an anionic radical-polymerizable monomer unit, and a nonionic radical-polymerizable monomer unit; or an amphoteric water-soluble polymer obtained by polymerizing a cationic radical-polymerizable monomer with an anionic radical-polymerizable monomer in the presence of a polysaccharide.

When paper must be produced with excellent formation, the component (B) preferably satisfies Ca/An<1.2. On the other hand, when paper must be produced with excellent retention, the component (B) preferably satisfies Ca/An>5.

And, the component (B) preferably has a 0.5% salted viscosity of 10 to 100 mPa·s.

The composition according to the present invention can be preferably applied to a method of papermaking in which any one of the composition mentioned above is added to a stuff and then papermaking is conducted.

EXAMPLE

The present invention is more concretely described below with reference to Examples and Comparative Examples. In the following description, "%", refers to weight %, and "parts" refers to parts by weight.

Production Example 1

Production of Cationic Polymer

In a stainless-steel reaction bottle were placed an aqueous solution of dimethylaminoethyl acrylate methyl chloride quaternary salt (hereinafter referred to as "DAC") and an aqueous solution of acrylamide (hereinafter referred to as "AM") in a total amount of 760 g so as to provide a DAC/AM molar ratio of 10/90 (DAC/AM weight ratio of 23.2/76.8) and a solid content of 28%.

Subsequently, the solution was adjusted to a temperature of 10° C. while blowing nitrogen gas into the solution for 60 minutes. Then, azobisamidinopropane hydrochloride (hereinafter referred to as V-50), cupric chloride, ammonium persulfate and sodium bisulfite, were added at concentrations of 1,000 ppm, 0.3 ppm, 30 ppm and 30 ppm, respectively based on the solid weight of all monomers and starch, followed by conducting polymerization by irradiation at an irradiation intensity of 6.0 mW/cm$^2$ for 60 minutes using a 100 W black light arranged above the reaction bottle to obtain a cationic polymer in hydrous gel form.

The obtained cationic polymer was taken out of the bottle and was dried and ground to obtain a powder amphoteric polymer. This cationic polymer is referred to as C-1.

The obtained polymer was determined for the 0.5% salted viscosity (hereinafter simply referred to as salted viscosity). The results are shown in Table 1.

The abbreviations in Table 1 denote the following, and 0.5% salted viscosity is described simply as salted viscosity.

DAC: methyl chloride quaternary salt of dimethylaminoethyl acrylate
AA: acrylic acid
AM: acrylamide

TABLE 1

|  |  | Polymer | | | | |
|  |  | Monomer (mol %) | | | Cation Equivalent | Salted viscosity |
|  | Abbreviation | DAC | AA | AM | (meq/g) | Ca/An | (mPa·s) |
| Cationic Polymer | C-1 | 10 | 0 | 90 | 1.2 |  | 65 |
| Amphoteric Polymer | CR-1 | 42 | 5 | 53 |  | 8.4 | 28 |
|  | AR-1 | 30 | 35 | 35 |  | 0.9 | 20 |

TABLE 1-continued

|  | Monomer (mol %) | | | Polymer | | |
|---|---|---|---|---|---|---|
| | | | | Cation Equivalent | | Salted viscosity |
| Abbreviation | DAC | AA | AM | (meq/g) | Ca/An | (mPa · s) |
| CO-1 | 23 | 2 | 75 | | 11.5 | 43 |
| CO-2 | 15 | 8.6 | 76.4 | | 1.7 | 45 |
| CO-3 | 15.8 | 1 | 83.2 | | 15.8 | 44 |

Production Example 2

Production of Amphoteric Polymer

A powdery amphoteric polymer was produced in the same manner as in Example 1 except that components and proportions to be used were changed to those shown in Table 1 and the solid content was adjusted so that maximum temperature at polymerization became 85 to 90° C.

The obtained amphoteric polymers were determined for the salted viscosity. The results are shown in Table 1.

Production Example 3

Production of Polysaccharide-Modified Amphoteric Polymer

In a stainless-steel reaction bottle were placed an aqueous solution of DAC, an aqueous solution of AA and an aqueous solution of AM in a total amount of 760 g so as to provide a DAC/AA/AM molar ratio of 42/5/53 (DAC/AA/AM weight ratio of 66.3/3.0/30.7) and a solid content of 56%.

An amphoterized starch slurry (Ace KT-245 from Oji Cornstarch Co., Ltd.; solid content: 22% or less; hereinafter referred to as "KT-245") was diluted to a solid content of 5% with an ion exchanged water and further subjected to heating and cooking at 80° C. for 30 minutes to obtain an amphoterized starch slurry having a solid content of 6%. The obtained amphoterized starch slurry was added in an amount of 213 g which corresponds to 3% relative to the total amount of monomers and starch expressed in terms of solid contents thereof. Also, 20 g of ion exchanged water was added to adjust the solid content of all monomers and starch to 43% and the total weight of the same to 1.0 kg, followed by stirring and dispersing.

Subsequently, the solution was adjusted to a temperature of 10° C. while blowing nitrogen gas into the solution for 60 minutes. Then, V-50, cupric chloride, ammonium persulfate and sodium bisulfite, were added at concentrations of 1,000 ppm, 0.3 ppm, 30 ppm and 30 ppm, respectively based on the solid weight of all monomers and starch, followed by conducting polymerization by irradiation at an irradiation intensity of 6.0 mW/cm$^2$ for 60 minutes using a 100 W black light arranged above the reaction bottle to obtain a water-soluble amphoteric polymer in hydrous gel form.

The obtained amphoteric polymer was taken out of the bottle and was dried and ground to obtain a powdery amphoteric polymer. This amphoteric polymer is referred to as SCR-1.

The obtained polymer was determined for the salted viscosity. The results are shown in Table 2.

TABLE 2

| Production Example | Abbreviation | Starch KT-245 (%) [1] | Monomer (mol %) | | | Polymer | Salted viscosity (mPa · s) |
|---|---|---|---|---|---|---|---|
| | | | DAC | AA | AM | Ca/An | |
| 3 | SCR-1 | 3 | 42 | 5 | 53 | 8.4 | 23 |
| 4 | SAR-1 | 3 | 30 | 35 | 35 | 0.9 | 18 |
| 5 | SCR-2 | 3 | 20 | 2 | 78 | 10.0 | 30 |

[1] proportion relative to total amount of starch and monomers

Production Examples 4 and 5

Polymers were produced in the same manner as in Production Example 3, except that components and proportions to be used were changed to those shown in Table 2 above.

The obtained polymers were determined for the salted viscosity. The results are shown in Table 2.

Examples 1 and 2

The component (A) and the component (B) shown in the following Table 3 were mixed in accordance with the proportion shown in Table 3 to produce a composition. As a retention aid, an aqueous solution containing 0.05 weight % of the following composition was used.

TABLE 3

| Composition | Polymers to be used (Parts) | | Ca/An after mixing |
|---|---|---|---|
| | (A) | (B) | |
| BL-1 | C-1 (50) | CR-1 (50) | 11.5 |
| BL-2 | C-1 (70) | AR-1 (30) | 1.7 |

A pulp slurry of 1% solid content (hereinafter referred to as a raw pulp slurry) consisting of deinked waste paper (50 SS %) and kraft pulp (50 SS %) from a broad leaf tree, both of which had been disintegrated and beated, was employed. In this respect, the deinked waste paper and the pulp were disintegrated to the Canadian standard freeness (herein after referred to as CSF) of 350 ml according to JIS P 8121 except that the 1% sample was used.

To the raw pulp slurry, the following components (1) to (5) were added in this order at intervals of 10 seconds under stirring at 1,000 rpm, and the total retention was measured by means of the dynamic drainage jar method. Paper formation was evaluated as follows: A pulp slurry to which the retention aid was added was used to carry out papermaking employing a square type bronze screen from Kumagai Riki Kogyo Co., Ltd. to attain a basis weight of 60 g/m$^2$ before pressing using a square type sheet machine press. Then, a formation index (the greater the index is, the better the formation is) of the resultant paper was measured with a formation tester after it was dried at 100° C. in an autodrier.

The obtained results are shown in Table 4. The final pH value of the pulp slurry was 7.9.

(1) Light calcium carbonate: 20% (a proportion in relation to the pulp solid content in the pulp slurry, and hereinafter referred to as "in relation to pulp")
(2) Cationic starch: 0.3% (in relation to pulp)
(3) Aluminum sulfate: 1.7% (in relation to pulp)
(4) Paper strength agent (a 15% aqueous solution of a copolymer made of DAC/AA/AM=20/10/70 (molar ratio); viscosity: 3,500 mPa·s): 0.5%
(5) Retention aid: 150 ppm (in relation to pulp)

TABLE 4

| | Retention aid | Addition amount (ppm) | Total retention (%) | Formation |
|---|---|---|---|---|
| Example 1 | BL-1 | 150 | 87.8 | 60 |
| Example 2 | BL-2 | 150 | 88.9 | 68 |
| Comparative Example 1 | CO-1 | 150 | 84.5 | 50 |
| Comparative Example 2 | CO-2 | 150 | 84.1 | 59 |
| Comparative Example 3 | C-1 | 150 | 87.1 | 40 |

Comparative Examples 1 to 3

Performances of retention aids were evaluated in the same manner as in Example 1, except that CO-1, CO-2 and C-1 shown in Table 1 were employed as retention aids. The obtained results are shown in Table 4.

Discussion

The results in Table 4 show that the present retention aid was excellent in both total retention and formation. On the other hand, the Comparative Examples 1 and 2, in which amphoteric polymers having the same monomer compositions as the Examples were singly used, were inferior in the balance between retention and formation. Also, the Comparative Example 3 in which the component (A) was singly used was relatively good in retention but inferior in formation.

Examples 3 to 5

The component (A) and the component (B) shown in the following Table 5 were mixed in accordance with the proportion shown in Table 5 to produce a composition. As a retention aid, an aqueous solution containing 0.05 weight % of the following composition was used.

TABLE 5

| Composition | Polymers to be used (Parts) | | Ca/An after mixing |
|---|---|---|---|
| | (A) | (B) | |
| BL-3 | C-1 (50) | SCR-1 (50) | 11.5 |
| BL-4 | C-1 (70) | SAR-1 (30) | 1.7 |
| BL-5 | C-1 (50) | SCR-2 (50) | 15.8 |

As a raw pulp slurry, a pulp slurry of 1% solid content consisting of deinked waste paper (70 SS %) and kraft pulp (30 SS %) from a broad leaf tree, both of which had been disintegrated and beated, was used.

To the raw pulp slurry, the above components (1) to (5) were added under stirring at 1000 rpm in the same manner as in Example 1. Then, total retention was measured.

The results obtained are shown in Table 6. The final pH value of the pulp slurry was 7.9.

TABLE 6

| | Retention aid | Addition amount (ppm) | Total retention (%) | Formation |
|---|---|---|---|---|
| Example 3 | BL-3 | 150 | 85.5 | 80 |
| Example 4 | BL-4 | 150 | 85.6 | 95 |
| Example 5 | BL-5 | 150 | 86.8 | 81 |
| Comparative Example 4 | CO-1 | 150 | 82.1 | 40 |
| Comparative Example 5 | CO-2 | 150 | 82.6 | 45 |
| Comparative Example 6 | CO-3 | 150 | 84.0 | 45 |
| Comparative Example 7 | C-1 | 150 | 85.5 | 30 |

Comparative Examples 4 to 7

Performances of retention aids were evaluated in the same manner as in Example 3, except that as retention aids, those shown in Table 6 were employed. The obtained results are shown in Table 6.

Discussion

From the results in Table 6, the retention aids that contained polysaccharide-modified amphoteric polymers as the component (B) were excellent in both total retention and formation.

On the other hand, Comparative Examples 4 to 6, in which a single amphoteric polymer having the same monomer composition as Examples 3 to 5 was used, showed insufficient total retention and quite poor formation. Furthermore, Comparative Example 7 consisting of only the component (A) showed good total retention, but quite poor formation.

INDUSTRIAL APPLICABILITY

The composition according to the present invention can be preferably used as a retention aid, and utilized in papermaking industry.

The invention claimed is:

1. A method of papermaking, which comprises adding a composition for improving retention to stuff as a raw material for paper making, and then carrying out papermaking using said stuff to which said composition has been added, wherein said composition consists of (A) a cationic water-soluble polymer and (B) an amphoteric water-soluble polymer, in which said cationic water-soluble polymer (A) comprises 0.5 to 55.0 mole percent of a cationic radical-polymerizable monomer unit consisting essentially of a quaternary salt of a dialkylaminoalkyl (meth)acrylate, said amphoteric water-soluble polymer (B) comprises a cationic radical-polymerizable monomer unit consisting essentially of a quaternary salt of a dialkylaminoalkyl (meth)acrylate, an anionic radical-polymerizable monomer unit consisting essentially of a (meth)acrylic acid or a salt thereof, and a nonionic radical-polymerizable monomer unit consisting essentially of a (meth) acrylamide, and said component (B) has a molar proportion of the cationic radical-polymerizable monomer unit to the anionic radical-polymerizable monomer unit (hereinafter referred to as Ca/An) which satisfies a Ca/An of 5 to 15, and having a 0.5% salted viscosity of 10 to 80 mPa·s.

2. The method according to claim 1, wherein the component (A) is a copolymer which further comprises a nonionic radical-polymerizable monomer unit, and has a cation equivalent of 0.05 to 4.00 meq/g.

3. The method according to claim 1, wherein the component (A) has a 0.5% salted viscosity of 30 to 200 mPa·s.

4. The method according to claim 1, wherein the component (B) is an amphoteric water-soluble polymer obtained by polymerizing a quaternary salt of a dialkylaminoalkyl (meth)acrylate with a (meth)acrylic acid or a salt thereof and a (meth) acrylamide in a presence of a polysaccharide.

5. The method to claim 4, wherein said polysaccharide is one subjected to cooking treatment.

6. The method according to claim 1, wherein component (B) is in a form of powder.

7. A method for improving retention of a stuff as a raw material in papermaking, which comprises adding to said stuff a retention improving composition which is of one-pack type, wherein said composition consists of (A) a cationic water-soluble polymer and (B) an amphoteric water-soluble polymer, in which said cationic water-soluble polymer (A) comprises 0.5 to 55.0 mole percent of a cationic radical-polymerizable monomer unit consisting essentially of a quaternary salt of a dialkylaminoalkyl (meth)acrylate, said amphoteric water-soluble polymer (B) comprises a cationic radical-polymerizable monomer unit consisting essentially of a quaternary salt of a dialkylaminoalkyl (meth)acrylate, an anionic radical-polymerizable monomer unit consisting essentially of a (meth)acrylic acid or a salt thereof, and a nonionic radical-polymerizable monomer unit consisting essentially of a (meth) acrylamide, and said component (B) has a molar proportion of the cationic radical-polymerizable monomer unit to the anionic radical-polymerizable monomer unit (hereinafter referred to as Ca/An) which satisfies a Ca/An of 5 to 15, and having a 0.5% salted viscosity of 10 to 80 mPa·s.

8. A method of papermaking, which comprises adding a composition for improving retention to a stuff as a raw material for papermaking, and then carrying out papermaking using said stuff to which said composition was added, wherein said composition consists of (A) a cationic water-soluble polymer and (B) an amphoteric water-soluble polymer, in which said cationic water-soluble polymer (A) comprises 0.5 to 55.0 mole percent of a cationic radical-polymerizable monomer unit consisting essentially of a quaternary salt of a dialkylaminoalkyl (meth)acrylate, and said amphoteric water-soluble polymer (B) comprises a cationic radical-polymerizable monomer unit consisting essentially of a quaternary salt of a dialkylaminoalkyl (meth)acrylate, a anionic radical-polymerizable monomer unit consisting essentially of a (meth)acrylic acid or a salt thereof, and a nonionic radical-polymerizable monomer unit consisting essentially of a (meth) acrylamide, said component (B) having a molar proportion of the cationic radical-polymerizable monomer unit to the anionic radical-polymerizable monomer unit (hereinafter referred to as Ca/An) which satisfies a Ca/An of 0.5 to 0.9, and having a 0.5% salted viscosity of 10 to 50 mPa·s.

9. A method for improving retention of a stuff as a raw material used in paper making according to claim 8, which comprises adding to said stuff the retention improving composition, wherein said retention improving composition is a one-pack.

10. The method according to claim 8, wherein the component (A) is a copolymer which further comprises a nonionic radical-polymerizable monomer unit, and has a cation equivalent of 0.05 to 4.00 meq/g.

11. The method according to claim 8, wherein the component (A) has a 0.5% salted viscosity of 30 to 200 mPa·s.

12. The method according to claim 8, wherein the component (B) is an amphoteric water-soluble polymer obtained by polymerizing a quaternary salt of a dialkylaminoalkyl (meth)acrylate with a (meth)acrylic acid or a salt thereof and a (meth) acrylamide in a presence of a polysaccharide.

13. The method according to claim 12, in which said polysaccharide is one subjected to cooking treatment.

14. The method according to claim 8, in which the component (B) is in a form of powder.

* * * * *